United States Patent
Clark et al.

(10) Patent No.: US 7,305,772 B2
(45) Date of Patent: Dec. 11, 2007

(54) GRAPHICAL CLINOMETER DISPLAY SYSTEM AND METHOD

(75) Inventors: Becky L. Clark, Everett, WA (US); Tina L. Ricco, Mukilteo, WA (US); Christopher W. Fay, Seattle, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 11/410,704

(22) Filed: Apr. 24, 2006

(65) Prior Publication Data

US 2007/0245578 A1    Oct. 25, 2007

(51) Int. Cl.
*G01C 9/06* (2006.01)
(52) U.S. Cl. ......................... 33/366.27; 701/4
(58) Field of Classification Search ............. 33/354, 33/365, 366.12, 366.27; 340/689, 988; 701/4; 702/150, 154
See application file for complete search history.

(56) References Cited

U.S. PATENT DOCUMENTS

| | | | |
|---|---|---|---|
| 4,763,268 A * | 8/1988 | Itoh et al. ........... 340/988 |
| 5,313,713 A * | 5/1994 | Heger et al. ........... 33/366.27 |
| 5,488,779 A * | 2/1996 | Schultheis et al. ....... 33/366.27 |
| 5,761,818 A | 6/1998 | Hopkins et al. .......... 33/366 |
| 5,956,260 A * | 9/1999 | Heger et al. ........... 702/154 |
| 6,389,333 B1 * | 5/2002 | Hansman et al. ........... 701/4 |
| 6,473,676 B2 * | 10/2002 | Katz et al. ............ 701/4 |
| 6,564,142 B2 | 5/2003 | Godwin et al. ........... 701/124 |
| 6,865,453 B1 * | 3/2005 | Burch et al. ........... 701/4 |
| 6,970,107 B2 * | 11/2005 | Gannett ................ 340/967 |
| 7,188,426 B2 * | 3/2007 | Barr .................. 702/154 |
| 2001/0039466 A1 * | 11/2001 | Katz et al. ............ 701/4 |

\* cited by examiner

*Primary Examiner*—G. Bradley Bennett
(74) *Attorney, Agent, or Firm*—Wildman, Harrold, Allen & Dixon, LLP

(57) ABSTRACT

A system for monitoring inclination of a vehicle is disclosed, wherein the system comprises a clinometer in communication with a computer. The clinometer is configured to measure at least one inclination angle of the vehicle and send an electrical signal representing the at least one inclination angle to the computer. The computer is configured to transform the signal back into the at least one inclination angle and present a graphical display. The graphical display comprises at least one representation of the vehicle which rotates in real-time as the at least one inclination angle changes.

25 Claims, 6 Drawing Sheets

GRAPHICAL CLINOMETER DISPLAY SYSTEM AND METHOD

STATEMENT OF GOVERNMENT RIGHTS

This invention was made with Government support under contract number DMR-0079992, awarded by the National Science Foundation Materials Research Science and Engineering Center. The government has certain rights in the invention.

BACKGROUND

The present application relates generally to systems for measuring the angles of inclination for large objects and, more particularly, to systems creating a graphical display of a large object whose angle of inclination is being measured.

Large vehicles and other objects are often jacked up off the ground in a variety of settings. For example, during assembly, production, testing, maintenance, inspection, or repair of a large vehicle such as an aircraft, the vehicle may be jacked up to facilitate access to parts of the vehicle. While jacking the vehicle up or down, it can be beneficial to monitor the roll and pitch of the vehicle. Keeping the vehicle level to the ground can often improve the safety and efficiency of assembly, testing, maintenance, inspection, or repair operations.

The roll and pitch of vehicles and other objects have previously been monitored during jacking procedures by using clinometers such as plum bobs, spirit levels, or digital levels with direct-reading numerical displays. These devices typically require that a human observer be located in a hazardous area, such as a wheel well, during jacking and positioning operations. Also, the non-intuitive means of interpreting these devices can lead to errors, causing harm to the observer or damage to the vehicle or other object.

SUMMARY

The above-mentioned drawbacks associated with existing systems are addressed by embodiments of the present application, which will be understood by reading and studying the following specification.

In one embodiment, a system for monitoring inclination of a vehicle comprises a clinometer and a computer. The clinometer is configured to measure at least one inclination angle of the vehicle and send a signal representing the at least one inclination angle to the computer. The computer comprises a graphical display which includes at least one representation of the vehicle. The at least one representation of the vehicle is configured to rotate in substantially real-time as the at least one inclination angle changes.

In another embodiment, a machine readable medium comprises machine readable instructions for causing a computer to perform a method for displaying a pitch angle and a roll angle of a vehicle. The method comprises receiving an electrical signal from a clinometer and transforming the signal into the pitch angle and the roll angle. The method further comprises displaying a front view vehicle icon on the graphical display of the computer, rotating the front view vehicle icon in real-time as the roll angle changes, displaying a side view vehicle icon on a graphical display of the computer, and rotating the side view vehicle icon in substantially real-time as the pitch angle changes.

In another embodiment, a process is provided for monitoring a first inclination angle and a second inclination angle of an object. The process comprises connecting a clinometer to the object and establishing a communication link between the clinometer and a computer configured to receive electrical signals from the clinometer. The process further comprises displaying a first icon and a second icon on a graphical display of the computer, causing the first icon to rotate as the first inclination angle changes, and causing the second icon to rotate as the second inclination angle changes.

These and other embodiments of the present application will be discussed more fully in the detailed description. The features, functions, and advantages can be achieved independently in various embodiments of the present application, or may be combined in yet other embodiments.

BRIEF DESCRIPTION OF DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Embodiments of the present application may be useful in measuring angles of inclination of vehicles and other objects. For example, aircraft, automobiles, ships, buses, trains, recreational vehicles, heavy equipment, machines, structures (e.g., manufactured homes, trailers, etc.), and other objects may be measured using embodiments of the present application. For purposes of illustration, some embodiments of the present application will be described primarily with reference to an aircraft. However, the present application is not limited in application to aircraft.

Figure 1:
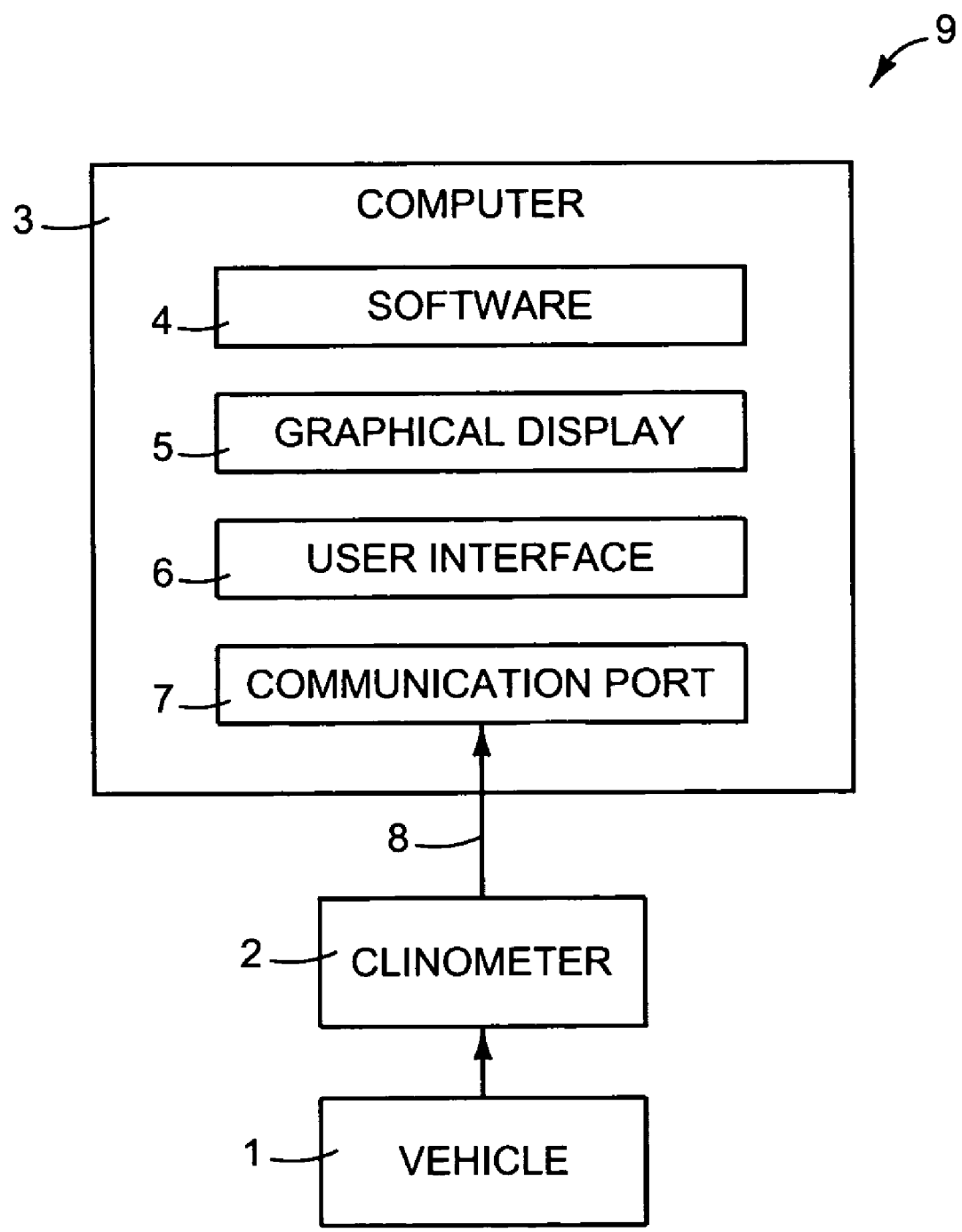
FIG. 1 is a block diagram showing some components of a graphical clinometer display system.

FIG. 1 is a block diagram showing some components of a graphical clinometer display system 9. In the illustrated embodiment, the system 9 comprises a computer 3 and a clinometer 2 affixed to a vehicle 1 such as an aircraft, automobile, ship, bus, train, or recreational vehicle. In other embodiments, the clinometer 2 may be affixed to a wide variety of other large objects, such as, for example, heavy machinery, industrial equipment, or structures.

The system 9 further comprises a computer 3 in communication with the clinometer 2 via one or more connections 8. The computer 3 may comprise any suitable computing device, such as a server, workstation, desktop computer, laptop computer, tablet computer, handheld computer, personal digital assistant, or mobile telephone. The computer 3 may receive signals from the clinometer 2 via a connection 8 between the clinometer 2 and a communication port 7 of the computer 3. The connection 8 may comprise a variety of wired communication links (e.g., Universal Serial Bus (USB), Ethernet, FireWire (IEEE 1394), small computer system interface (SCSI), serial cable, parallel cable, etc.) or wireless communication links (e.g., radio frequency (RF) communication, infrared (IR) communication, Bluetooth, IEEE 802.11, etc.). In addition, the connection 8 may include one or more telecommunications networks, such as, for example, a local area network or the Internet. The computer 3 may comprise software 4 that transforms an output comprising an electrical signal from the clinometer 2 into at least one inclination angle represented on a graphical display 5 on the computer 3. The software 4 may also cause the computer 3 to create a user interface 6 that allows the user to provide input to the software 4; the user interface 6 may or may not be part of the graphical display 5.

The clinometer 2 may be permanently or temporarily mounted on or attached anywhere on the vehicle 1 to monitor the levelness or orientation of the vehicle 1 with respect to a selected reference angle. However, the clinometer 2 need not be physically attached to the vehicle 1, so long as the clinometer 2 can be used to monitor inclination measurements, such as roll and pitch, of the vehicle 1.

Some embodiments of the clinometer 2 may comprise a sensor capable of sending signals in substantially real-time to an external workstation or computer 3. The clinometer 2 may comprise a biaxial inclinometer, monitoring the angle of the vehicle 1 in two axial planes. For example, the clinometer 2 may comprise an electrolytic fluid level sensor, which operates as a bubble level and utilizes electronics that sense resistance changes as the bubble moves. The changes in resistance may be transformed into a digital angular output signal which may be sent to the computer 3. The clinometer 2 could also comprise a two-axis level sensor which measures and transmits orthogonal level indication signals to the computer 3. Or, the clinometer 2 could comprise two inclinometers, which each measure one axis. Together, the inclinometers could be used to monitor the angle of the vehicle 1 in two planes. Other clinometers, positional sensors, or level sensors that communicate with computers, such as rotation sensors, tilt sensors, or angular position sensors, may be used. Embodiments of the clinometer 2 could use a single sensor, or multiple sensors.

Software 4 installed onto a computer 3 may cause the computer 3 to interpret the signal received from the clinometer 2 and show the inclination measurements such as roll and pitch on a graphical display 5 of the computer 3, thereby transforming the output of the clinometer 2 into the graphical display 5 showing the angles of inclination measured by the clinometer 2. The graphical display 5 may comprise a graphical representation of both roll and pitch using a vehicle icon, and an absolute, numerical angular representation. The graphical representation and numerical representation may be offset from zero to consider a selected reference angle. The graphical representation and numerical representation may change substantially in real-time to correspond to real-time changes in the roll and pitch, as measured by the clinometer 2. The graphical representation on the graphical display 5 may give the user an intuitive understanding of the measurements taken by the clinometer 2, such as the roll and pitch conditions of the vehicle 1. The numeric representation may provide more precise information to the user.

Figure 2:
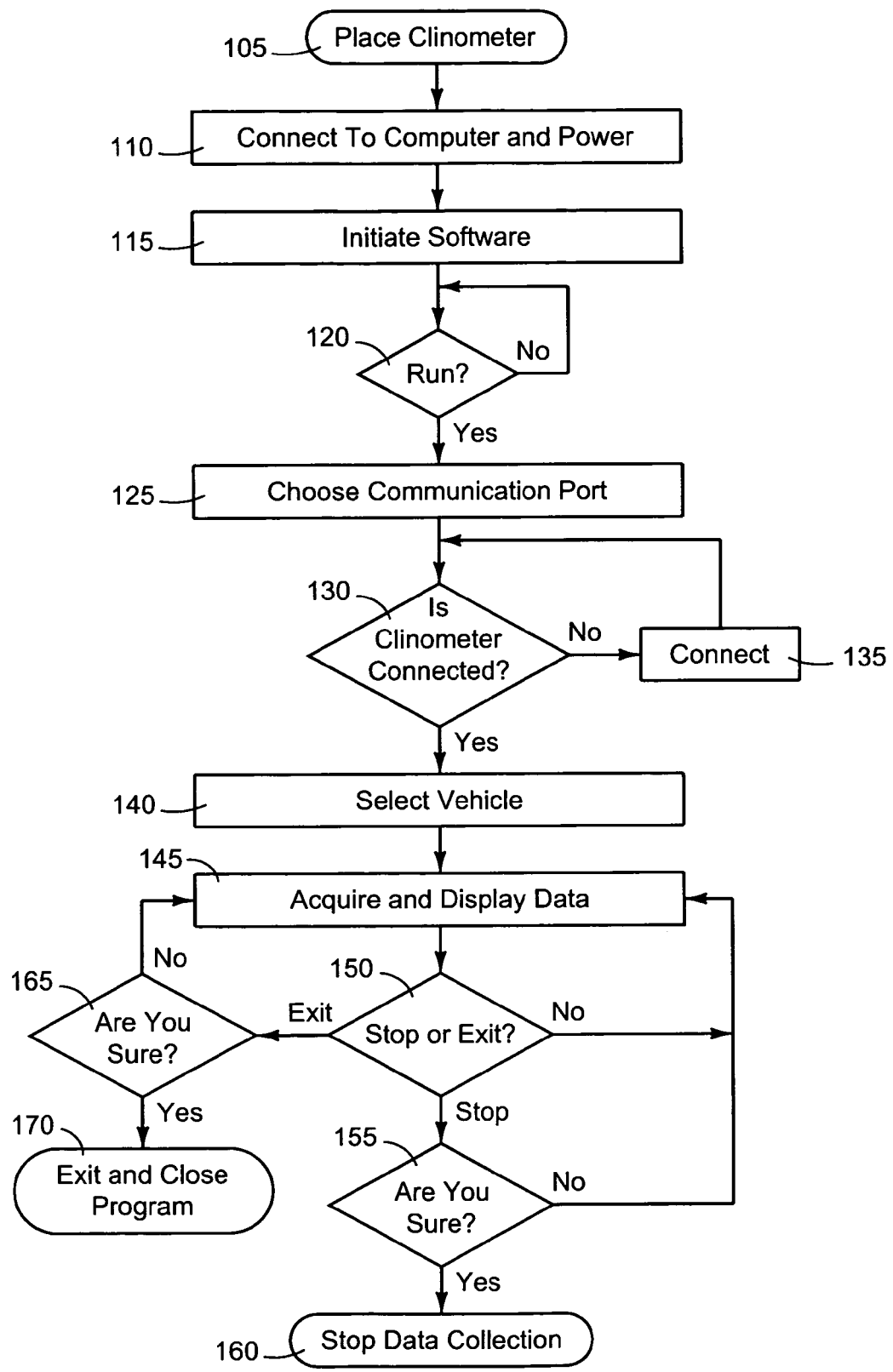
FIG. 2 shows a process for monitoring the inclination of a vehicle such as an aircraft.

Some embodiments of the present application utilize the process shown in FIG. 2 to create the graphical representation of the vehicle 1. The clinometer 2 or sensor may first be placed on or operatively connected to the vehicle 1, as shown in block 105. After the clinometer 2 has been placed on the vehicle 1, the clinometer 2 may be connected to the communication port 7 of the computer 3 and to a power source, as shown in block 110. The clinometer 2 may be connected to an AC power source such as an electrical outlet, or to a DC power source such as a battery. The clinometer 2 may also have been connected to the power source before the clinometer 2 was connected to the vehicle 1.

After the clinometer 2 has been connected to the communication port 7 of the computer 3, a user may initiate the software 4 used in embodiments of the present application, as shown in block 115. The software 4 may then wait for the user to click a RUN button 10, as shown in block 120. After the user has activated the software 4, the user may choose the communication port 7 from which the computer 3 will receive signals from the clinometer 2, as shown in block 125. After the user has chosen the communication port 7, the computer 3 may run a check to determine whether the clinometer 2 is connected to the communication port 7, as shown in block 130. If the computer 3 determines that the clinometer 2 is not connected to the communication port 7, then the computer 3 may attempt to connect to the clinometer 2, as shown in block 135, and return to block 130 to run the check again.

After the computer 3 has determined that the clinometer 2 is connected to the communication port 7, the software 4 may prompt the user to select a vehicle model, as shown in block 140. The vehicle models available for selection may include vehicle models originally programmed into the software 4, and may also include vehicle models customized by the user. The selection of the vehicle model may cause the graphical display 5 to display icons with appearances similar to the selected vehicle model, may set angles of inclination at which warning features are triggered, and may set angles of inclination which are treated as zero or level angles by the graphical display 5.

After the vehicle model has been selected, the software 4 may acquire data from the signal sent by the clinometer 2, and may display information on the graphical display 5 based on the data, as shown in block 145. The software 4 may continue to cause the graphical display 5 of the computer 3 to display updated information based on the measurements of the clinometer 2 so long as the user does not choose to stop or exit the program, which the software 4 checks for in block 150. The displayed information may be updated substantially in real-time based on changes in the measurements of the clinometer 2.

If the user chooses to stop the program, then the software 4 may confirm the user's choice by presenting the question, "Are you sure?" on the graphical display 5, as shown in block 155. If the user chooses, "No," then the software 4 may return to block 145, and continue to acquire data from the signal sent by the clinometer 2 and display information on the graphical display 5 based on the acquired data. If the user chooses, "Yes," then the software 4 may stop collecting data and stop updating the information shown on the graphical display 5, as shown in block 160.

If the user chooses to exit the software 4, then the user's choice may be confirmed by presenting the question, "Are you sure?" on the graphical display, as shown in block 165. If the user chooses, "No," then the software 4 may return to block 145, and continue to acquire data from the signal sent by the clinometer 2 and display information on the graphical display 5 to the user based on the acquired data. If the user chooses, "Yes," then the software 4 may allow the user to exit by closing the program, as shown in block 170.

Figure 3:
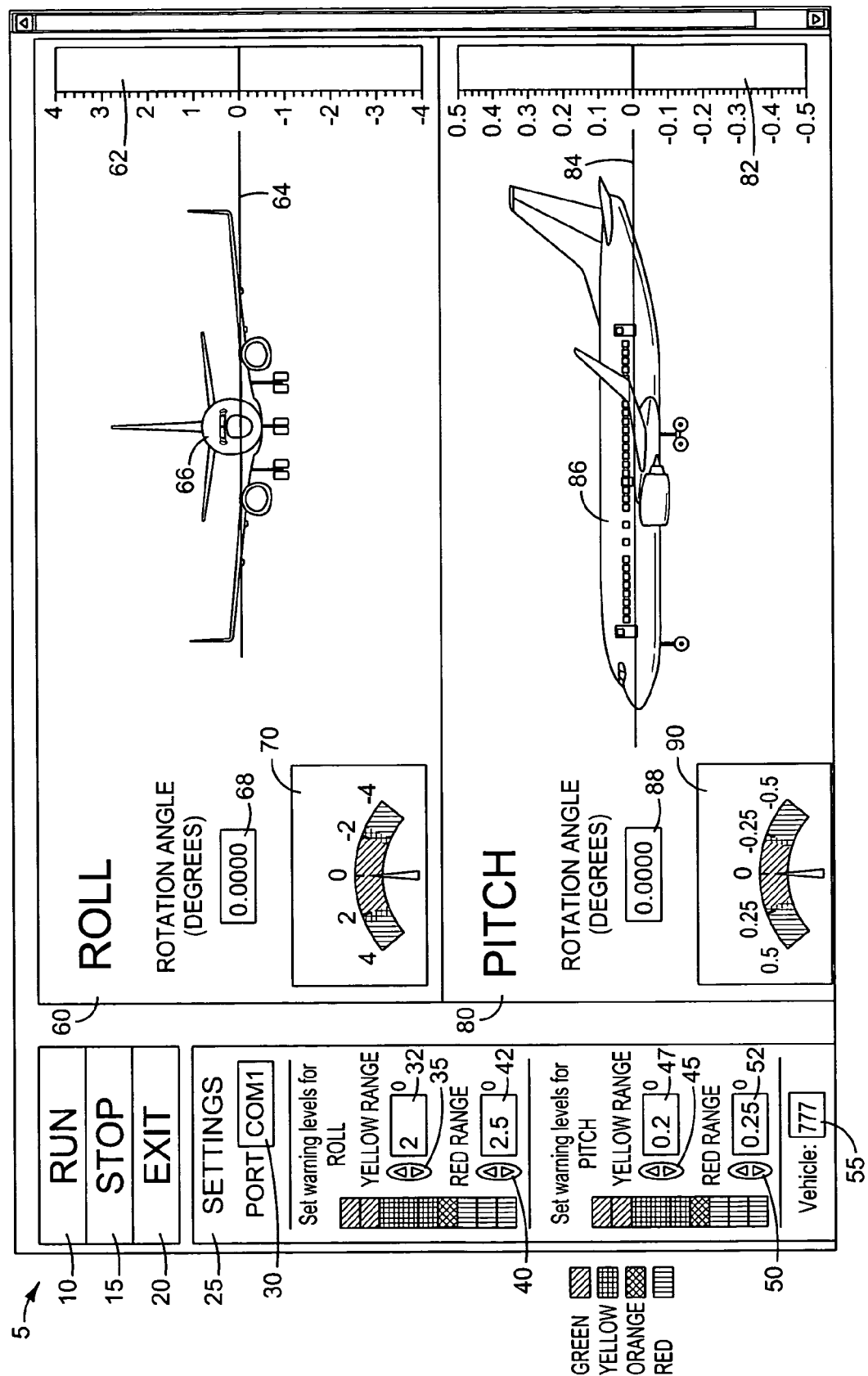
FIGS. 3-5 show screenshots of a graphical display in accordance with one embodiment of the present application.
Figure 4:
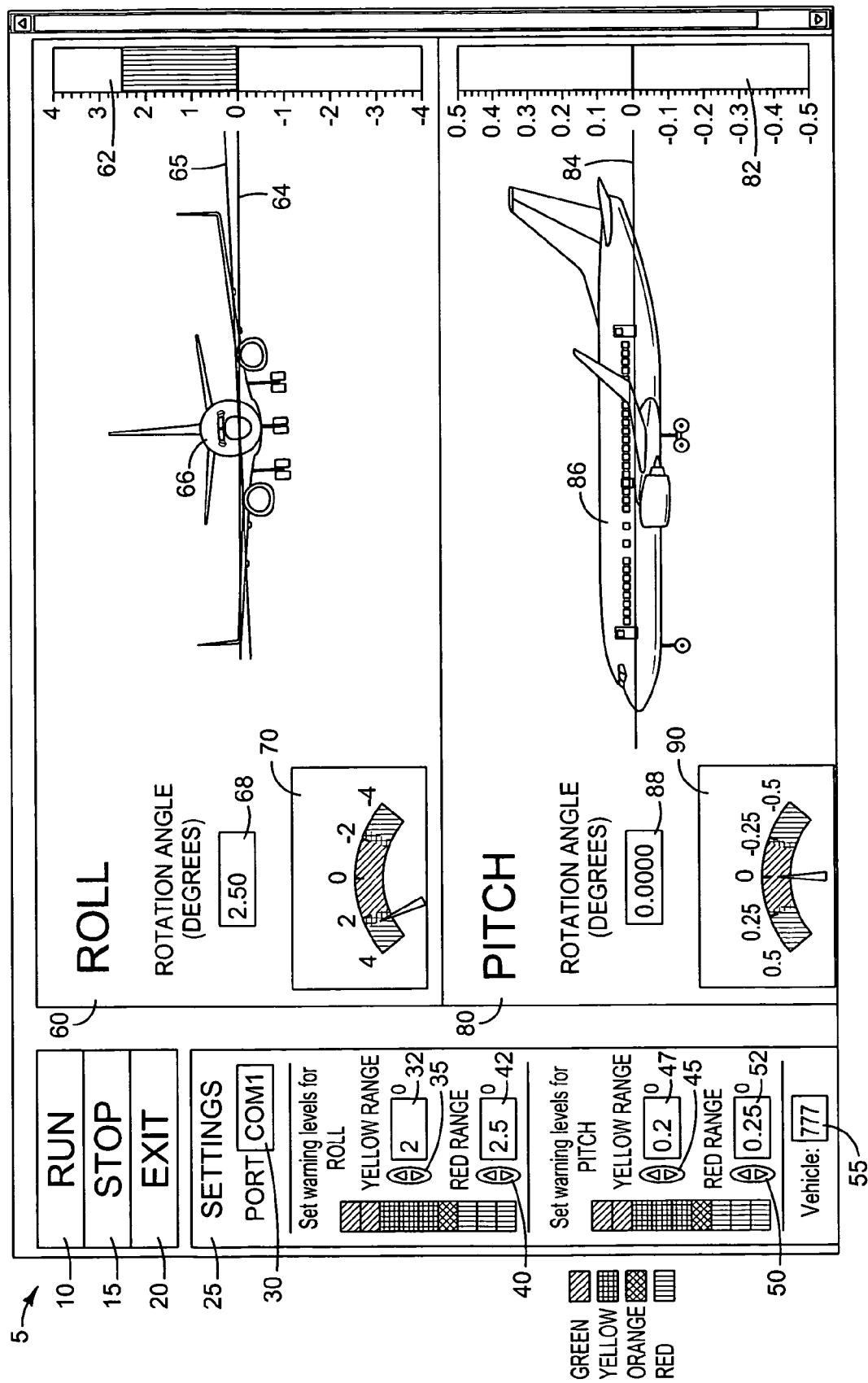
Figure 5:
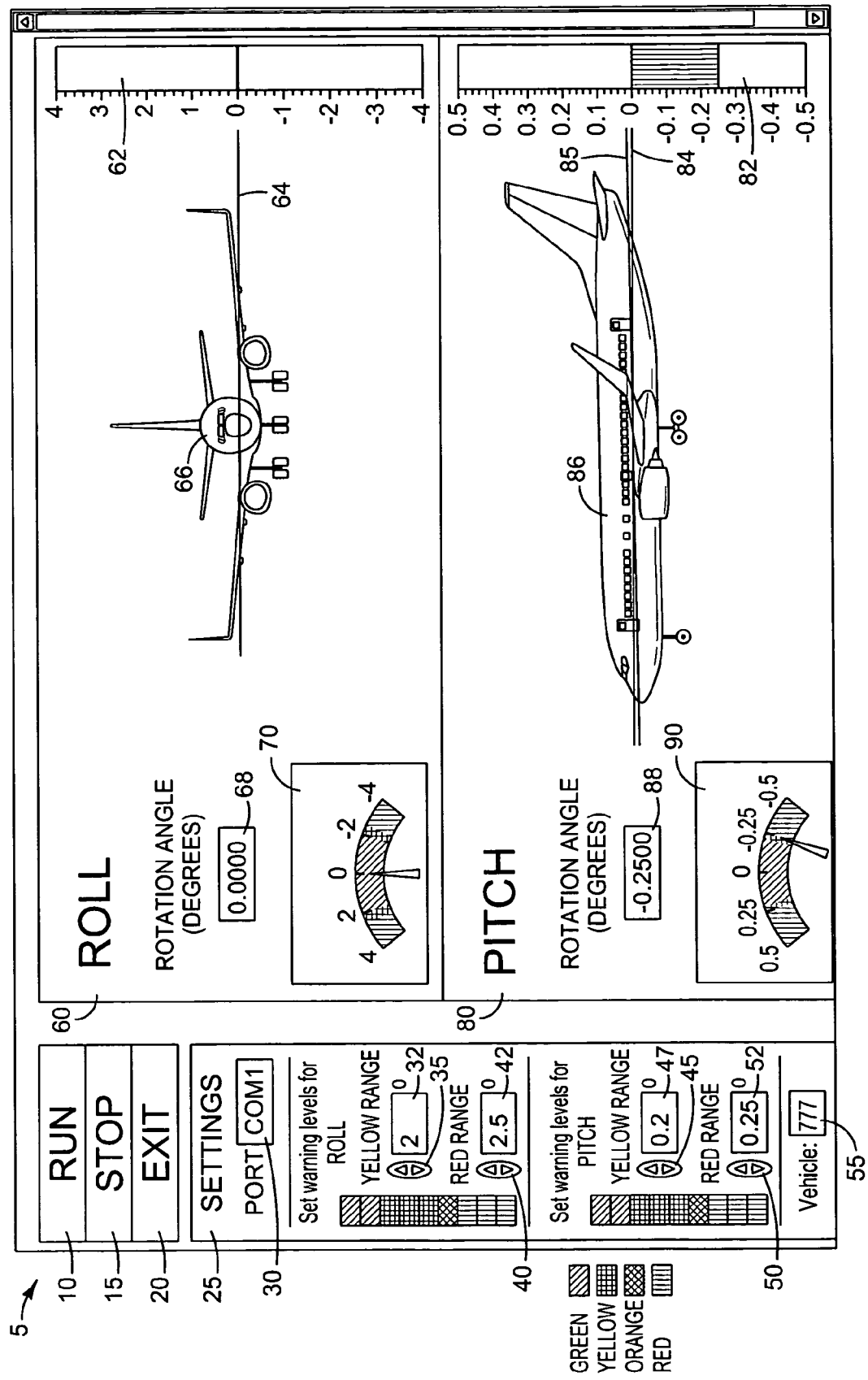

Embodiments of the graphical display 5 as applied to measuring the pitch and roll of a vehicle 1 during jacking operations are shown in FIGS. 3-5. In the illustrated embodiment, the vehicle 1 comprises an aircraft, whereas in other embodiments, the vehicle 1 may comprise an automobile, ship, bus, or train. As shown in FIGS. 3-5, the graphical display 5 may comprise a RUN button 10, a STOP button 15, an EXIT button 20, a SETTINGS box 25, a ROLL box 60, and a PITCH box 80.

The user may click the RUN button 10 to advance the process shown in FIG. 2 from block 120 to block 125. Once the software 4 is running, the user may click either the STOP button 15 or the EXIT button 20 to advance the process shown in FIG. 2 from block 150 to either block 155 or block 165, respectively.

The SETTINGS box 25 may comprise a port box 30, a YELLOW RANGE ROLL box 32, a YELLOW RANGE ROLL increment button 35, a RED RANGE ROLL box 42, a RED RANGE ROLL increment button 40, a YELLOW RANGE PITCH box 47, a YELLOW RANGE PITCH increment button 45, a RED RANGE PITCH box 52, a RED RANGE PITCH increment button 50, and a vehicle box 55.

The port box 30 may allow the user to choose the communication port 7 of the computer 3 that will receive signals from the clinometer 2, as shown in box 125 of FIG. 2. The user may select the communication port 7 by typing the name of the communication port 7 into the port box 30 manually, or may select the communication port 7 by clicking on one of a plurality of available ports displayed in a popup.

The vehicle box 55 may allow the user to select a specific vehicle or other object, such as an aircraft model, as shown in box 140 of FIG. 2. In the illustrated embodiment, the user may select an aircraft model by typing a model number into the vehicle box 55 manually, or may select the aircraft model by clicking on one of a plurality of aircraft models displayed in a popup. The choice of vehicle model may determine the appearance of a front view vehicle icon 66 and a side view vehicle icon 86, as well as the default values in the YELLOW RANGE ROLL box 32, the RED RANGE ROLL box 42, the YELLOW RANGE PITCH box 47, and the RED RANGE PITCH box 52. In the example shown in FIGS. 3-5, the Boeing 777 model has been chosen, causing front view and side view icons of the Boeing 777 model to be displayed, and causing the yellow range warning level for roll to be set at plus or minus 2°, the red range warning level for roll to be set at plus or minus 2.5°, the yellow range warning level for pitch to be set at plus or minus 0.2°, and the red range warning level to be set at plus or minus 0.25°. Other vehicle models and/or custom graphics may be programmed into the software 4, allowing the embodiments described herein to be useful for other aircraft or vehicles, as well as other objects.

The software 4 may be programmed to cause the graphical display 5 to show warning features by using yellow and red indicators to show when allowable user-defined threshold angles are exceeded. The software 4 may also cause the computer 3 to emit an audible alarm sound when any of the monitored angles enters either the yellow range warning level or the red range warning level. The user may leave these thresholds at the default values determined by the selected vehicle model, or may choose different values for these thresholds.

The YELLOW RANGE ROLL box 32 and RED RANGE ROLL box 42 may allow a user to select thresholds of roll angle at which the software 4 may issue a "yellow" warning or a "red" warning, respectively. The user may choose different values for these thresholds either by typing values into the YELLOW RANGE ROLL box 32 and RED RANGE ROLL box 42 manually, or may increase or decrease the values of the thresholds in selected increments (such as one degree, one-tenth of a degree, or one-hundredth of a degree) by clicking on the YELLOW RANGE ROLL increment button 35 and RED RANGE ROLL increment button 40. The choices for these thresholds may vary the relative proportions of green, yellow, orange, and red shown in the bar to the left of the YELLOW RANGE ROLL increment button 35 and RED RANGE ROLL increment button 40.

Similarly, The YELLOW RANGE PITCH box 47 and RED RANGE PITCH box 52 may allow a user to select thresholds of pitch angle at which the software 4 may issue a "yellow" warning or "red" warning, respectively. The user may choose different values for these thresholds either by typing values into the YELLOW RANGE PITCH box 47 and RED RANGE PITCH box 52 manually, or may increase or decrease the values of the thresholds in selected increments (such as one degree, one-tenth of a degree, or one-hundredth of a degree) by clicking on the YELLOW RANGE PITCH increment button 45 and RED RANGE PITCH increment button 50. The choices for these thresholds may vary the relative proportions of green, yellow, orange, and red shown in the bar to the left of the YELLOW RANGE PITCH increment button 45 and RED RANGE PITCH increment button 50.

The ROLL box 60 may comprise a front view vehicle icon 66, a zero roll angle line 64, a numerical roll angle display box 68, a roll angle dial box 70, and a roll angle meter 62. If the roll angle is nonzero, then the ROLL box 60 may also comprise an off-zero roll angle line 65, as shown in FIG. 4.

The front view vehicle icon 66 in the ROLL box 60 may be a sketch of a front view of the vehicle model chosen in the vehicle box 55 or may simply be a block representation of a front view of the vehicle. Custom icons corresponding to different vehicle models may be programmed into the software 4. Icons could be programmed which correspond to many different aircraft or other vehicles, making the software 4 applicable to many different industries. The icons could also be programmed to correspond to vehicle components, such as a door, fuselage, or vertical tab. The icon may look like the actual object being positioned; however, the icon may also be a mere schematic that displays the inclination measurements but does not look like the object being measured.

The front view vehicle icon 66 may rotate to show changes in the roll angle measured by the clinometer 2. The angle of rotation of the front view vehicle icon 66 within the ROLL box 60 may be the same as the roll angle measured by the clinometer 2. However, in some embodiments, the graphical display 5 may exaggerate the roll of the vehicle 1, making small deviations from the desired angle readily visible to the user. This exaggerated display of the pitch and roll of the vehicle 1 may quickly provide feedback on the results of leveling or positioning operations, which can be easily interpreted by a user. If the roll angle is nonzero, as shown in FIG. 4, the off-zero roll angle line 65 may appear in red either at the same angle away from the zero roll angle line 64 as the roll angle measured by the clinometer 2, or at an exaggerated angle away from the zero roll angle line 64 to make deviations easier to view.

The numerical roll angle display box 68 may show the actual roll angle measured by the clinometer 2 in numerical form. The roll angle dial box 70 may comprise a semicircle and numbers along the top of the semicircle representing possible measured roll angles. Sections of the semicircle may be colored to correspond to the threshold warning levels chosen in the SETTINGS box 25. In the examples shown in FIGS. 3-5, the section of the semicircle corresponding to a roll angle between −2.0° and 2.0° is colored green, the sections of the semicircle corresponding to roll angles between −2.5° and −2.0° and between 2.0° and 2.5° are colored yellow, and the sections of the semicircle corresponding to roll angles less than −2.5° and greater than 2.5° are colored red. The dial may point to the section of the semicircle corresponding to the roll angle measured by the clinometer 2.

The roll angle meter 62 in the ROLL box 60 may comprise a rectangle with markings and numbers representing the roll angle. The roll angle meter 62 may also comprise a horizontal line at the center of the roll angle meter 62 representing a roll angle of zero. If the roll angle is nonzero, then an area between the horizontal line and the measured angle may be colored red, as shown in FIG. 4.

The PITCH box 80 may comprise a side view vehicle icon 86, a zero pitch angle line 84, a numerical pitch angle display box 88, a pitch angle dial box 90, and a pitch angle meter 82. If the pitch angle is nonzero, then the PITCH box 80 may also comprise an off-zero pitch angle line 85, as shown in FIG. 5.

The side view vehicle icon 86 in the PITCH box 80 may be a sketch of a side view of the vehicle model chosen in the vehicle box 55 or may simply be a block representation of a side view of the vehicle. The side view vehicle icon 86 may rotate or otherwise change so that the side view vehicle icon 86 appears to rotate along a longitudinal axis as the pitch angle measured by the clinometer 2 changes. The apparent rotation of the side view vehicle icon 86 within the PITCH box 80 may be the same as the pitch angle measured by the clinometer 2, or may be exaggerated as with the front view vehicle icon 66. If the pitch angle measured by the clinometer 2 is nonzero, as shown in FIG. 5, the off-zero pitch angle line 85 may appear in red either at the same angle away from the zero pitch angle line 84 as the pitch angle measured by the clinometer 2, or at an exaggerated angle away from the zero pitch angle line 84 to make deviations easier to view.

The numerical pitch angle display box 88 may show the actual pitch angle measured by the clinometer 2 in numerical form. The pitch angle dial box 90 may comprise a semicircle and numbers along the top of the semicircle representing possible measured pitch angles. Sections of the semicircle may be colored to correspond to the threshold warning levels chosen in the SETTINGS box. In the examples shown in FIGS. 3-5, the section of the semicircle corresponding to a pitch angle between −0.20° and 0.20° is colored green, the sections of the semicircle corresponding to pitch angles between −0.25° and −0.20° and between 0.20° and 0.25° are colored yellow, and the sections of the semicircle corresponding to pitch angles less than −0.25° and greater than 0.25° are colored red. The dial may point to the section of the semicircle which represents the pitch angle measured by the clinometer 2.

The pitch angle meter 82 in the PITCH box 80 may comprise a rectangle with markings and numbers representing the pitch angle measured by the clinometer 2. The pitch angle meter 82 may also comprise a horizontal line at the center of the pitch angle meter 82 corresponding to a pitch angle of zero. If the pitch angle is nonzero, an area between the horizontal line and the measured angle may be colored red, as shown in FIG. 5.

Figure 6:
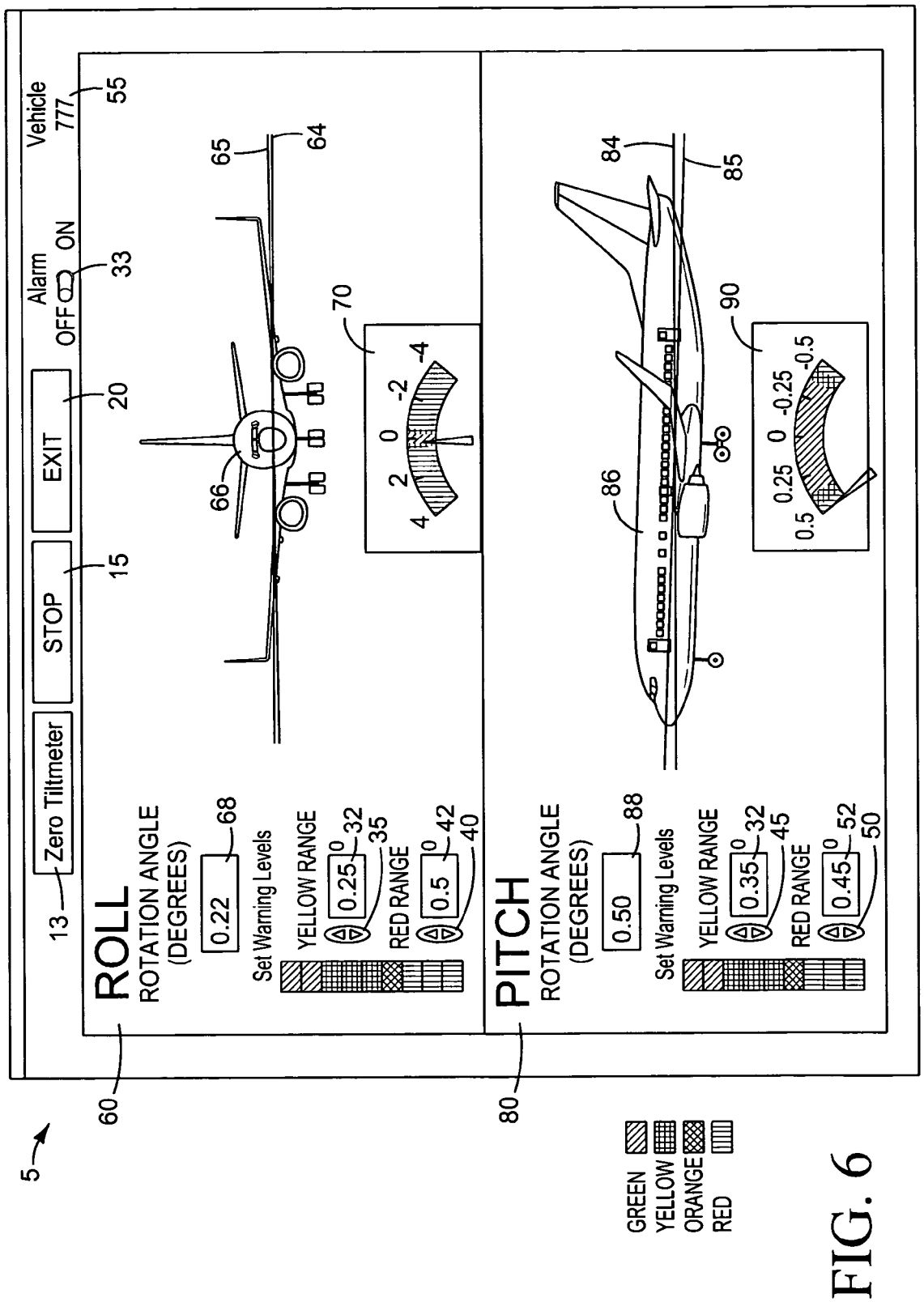
FIG. 6 shows a screenshot of a graphical display in accordance with an alternative embodiment of the present application.

FIG. 6 shows a screenshot of the graphical display 5 in an alternative embodiment. The embodiment shown in FIG. 6 comprises similar elements to those shown in FIGS. 3-5, but does not include a SETTINGS box 25, a port box 30, a roll angle meter 62, or a pitch angle meter 82. The graphical display 5 shown in FIG. 6 does comprise a RUN button 10, but it is not shown in FIG. 6 because the program is actually running; if the user clicks the STOP button 15, the program will stop, the STOP button 15 will become invisible, and the RUN button 10 will become visible.

In the embodiment shown in FIG. 6, the ROLL box 60 comprises the YELLOW RANGE ROLL box 32, YELLOW RANGE ROLL increment button 35, RED RANGE ROLL box 42, and RED RANGE ROLL increment button 40. In addition, the PITCH box 80 comprises the YELLOW RANGE PITCH box 47, YELLOW RANGE PITCH increment button 45, RED RANGE PITCH box 52, and RED RANGE PITCH increment button 50. The vehicle box 55 is located above the ROLL box 60, as are the RUN button 10, STOP button 15, and EXIT button 20.

As shown in FIG. 6, the graphical display 5 further comprises an alarm switch 33 which allows a user to toggle the program between an "Alarm ON" and an "Alarm OFF" state. In the "Alarm ON" state, the computer 3 may emit an audible alarm when either the pitch angle exceeds the pitch threshold warning level or the roll angle exceeds the roll threshold warning level. The threshold warning levels may be defined as either the values in the YELLOW RANGE ROLL box 32 and YELLOW RANGE PITCH box 47, or the values in the RED RANGE ROLL box 42 and RED RANGE PITCH box 52.

The graphical display 5 shown in FIG. 6 further comprises a Zero Tiltmeter button 13 located above the ROLL box 60. When the Zero Tiltmeter button 13 is clicked, a user interface 6 may become available, which may allow a user to define offset angles for particular vehicles or other objects, as discussed below.

The software 4 may cause the graphical display 5 to monitor a predetermined two-axis inclination by the use of user-defined set points, such as nose down two degrees, right wing down one degree, or may use a separate datum plane as a reference. The software 4 may cause the computer 3 to create a user interface 6, which may or may not be part of the graphical display 5, to allow a user to define offset angles for particular aircraft, causing the graphical display 5 to treat the offset angle as zero. For example, a Boeing 747 model may be constructed at a nose-down angle of about 0.25°; the software 4 may be programmed to cause the graphical display 5 to treat the vehicle 1 as level when the actual pitch angle of the vehicle is 0.25° nose-down. Pre-defined offset angles may be chosen by entering the appropriate vehicle code into the vehicle box 55, which may also determine the appearance of the vehicle icons 66, 86. Or, an offset angle could be defined to compensate for the clinometer 2 being affixed to a mounting surface of the vehicle 1 that is not level with the ground.

The remote monitoring of the vehicle 1 during leveling operations enabled by viewing the graphical display 5 on a computer 3 that is remote from the vehicle 1 improves safety by obviating the need for a human observer to be in a hazardous or awkward location, such as a wheel well, to observe a plumb bob, spirit level, or digital level with direct-reading numerical displays. The clinometer 2 may yield more accurate measurements because it may be affixed to any location on the vehicle 1, rather than being limited to positions that can be observed by a human observer. By enabling visualization of roll and pitch measurements in substantially real-time, vehicles 1 or other objects can be jacked and leveled with fewer persons and in less time. The graphical display 5, by providing an intuitive display showing whether the vehicle 1 is rolled right or left or pitched forward or backward, may also prevent damage to the vehicle 1 which could otherwise be caused by misunderstanding numerical measurements.

By installing the clinometer 2 on different components of the vehicle 1, embodiments of the present application could also be used to monitor specific components of the vehicle 1, such as door position, fuselage hinging, or vertical fin trim-tab set. Embodiments could be used for leveling procedures, rotation monitoring, or other processes that benefit from a graphical display 5 of clinometer measurements.

Although this invention has been described in terms of certain preferred embodiments, other embodiments that are apparent to those of ordinary skill in the art, including embodiments that do not provide all of the features and advantages set forth herein, are also within the scope of this invention. Rather, the scope of the present invention is defined only by reference to the appended claims and equivalents thereof.

What is claimed is:

1. A system for monitoring inclination of a vehicle separately from a control system of the vehicle comprising:
   an independent clinometer separate from a control system of the vehicle which is adapted to be attached to and removed from the vehicle, wherein the clinometer is configured to measure at least one inclination angle of the vehicle and send a signal representing the at least one inclination angle of the vehicle; and
   a computer separate from a control system of the vehicle in communication with the clinometer and configured to receive the signal,
   wherein the computer comprises a graphical display including at least one representation of the vehicle,
   wherein the at least one representation of the vehicle is configured to rotate in substantially real-time as the at least one inclination angle changes, and
   wherein the monitoring system is configured to be used to monitor inclination of the vehicle during at least one of assembly, production, testing, maintenance, inspection, and repair.

2. The system of claim 1, wherein:
   the clinometer is configured to measure at least two inclination angles of the vehicle;
   the signal represents the at least two inclination angles of the vehicle;
   the graphical display comprises at least two representations of the vehicle;
   each of the at least two representations of the vehicle corresponds to one of the at least two inclination angles; and
   the at least two representations of the vehicle are configured to rotate in substantially real-time with changes in the at least two inclination angles to which the at least two representations correspond.

3. The system of claim 2, wherein the clinometer comprises a two-axis level sensor.

4. The system of claim 2, wherein the graphical display further comprises at least two numerical displays showing numerical representations of the at least two inclination angles of the vehicle.

5. The system of claim 4, wherein:
   the at least two representations of the vehicle each comprise a zero angle line; and
   the at least two representations of the vehicle each comprise a nonzero angle line at an angle away from the zero angle line when the inclination angle to which the representation corresponds is nonzero.

6. The system of claim 1, wherein the computer is remote from the clinometer.

7. The system of claim 1, wherein the computer is configured to allow a user to select a vehicle model.

8. The system of claim 1, wherein the computer is configured to create at least one threshold warning level.

9. The system of claim 8, wherein the computer is configured to emit an audible alarm sound when an inclination angle exceeds the at least one threshold warning level.

10. The system of claim 1, wherein:
    the clinometer comprises at least two inclinometers; and
    the signal represents an angle measured by each of the at least two inclinometers.

11. The system of claim 1, wherein the vehicle comprises an aircraft.

12. The system of claim 1, wherein the vehicle comprises an automobile, ship, bus, train, or recreational vehicle.

13. A machine readable medium comprising machine readable instructions for causing a computer separate from a control system of a vehicle to perform a method for displaying a pitch angle and a roll angle of the vehicle, the method comprising:
    receiving an electrical signal from an independent clinometer separate from a control system of the vehicle;
    transforming the signal into the pitch angle and the roll angle;
    displaying a front view vehicle icon on a graphical display of the computer;
    rotating the front view vehicle icon in substantially real-time as the pitch angle changes;
    displaying a side view vehicle icon on the graphical display of the computer; and
    rotating the side view vehicle icon in substantially real-time as the roll angle changes,
    wherein the method is used during at least one of assembly, production, testing, maintenance, inspection, and repair of the vehicle.

14. The machine readable medium of claim 13, wherein the method further comprises displaying a numerical representation of the pitch angle and a numerical representation of the roll angle on the graphical display.

15. The machine readable medium of claim 13, wherein the method further comprises providing a user interface enabling a user to set a pitch threshold warning level and a roll threshold warning level.

16. The machine readable medium of claim 15, wherein the method further comprises allowing the user to select a vehicle model which sets the pitch threshold warning level and the roll threshold warning level at predetermined levels based on the vehicle model.

17. The machine readable medium of claim 16, where the method further comprises treating a selected reference angle as zero based on the selected vehicle model.

18. The machine readable medium of claim 15, wherein the method further comprises emitting an audible alarm when either the pitch angle exceeds the pitch threshold warning level or the roll angle exceeds the roll threshold warning level.

19. The machine readable medium of claim 13, wherein the vehicle comprises an aircraft.

20. The machine readable medium of claim 13, wherein the vehicle comprises an automobile, ship, bus, train, or recreational vehicle.

21. A process for discretely monitoring, separate from an object control system, a first inclination angle and a second inclination angle of the object comprising:
   connecting an independent clinometer, separate from an object control system, to the object;
   establishing a communication link between the clinometer and a computer separate from an object control system which is configured to receive electrical signals from the clinometer;
   displaying a first icon and a second icon on the graphical display of the computer;
   causing the first icon to rotate as the first inclination angle changes; and
   causing the second icon to rotate as the second inclination angle changes, wherein the process is used during at least one of assembly, production, testing, maintenance, inspection, and repair of the object.

22. The process of claim 21 further comprising:
   choosing an object model on a user interface of the computer;
   wherein choosing the object model causes the computer to display a first inclination angle threshold warning level and a second inclination angle threshold warning level; and
   emitting an audible alarm sound when the first inclination angle exceeds the first inclination angle threshold warning level or the second inclination angle exceeds the second inclination angle threshold warning level.

23. The process of claim 21 further comprising:
   choosing a first inclination angle threshold warning level on a user interface of the computer;
   choosing a second inclination angle threshold warning level on the user interface of the computer; and
   emitting an audible alarm sound when the first inclination angle exceeds the first inclination angle threshold warning level or the second inclination angle exceeds the second inclination angle threshold warning level.

24. The process of claim 21, wherein the object comprises a vehicle.

25. The process of claim 21, wherein the object comprises a machine, structure, component, or equipment.

* * * * *